Feb. 11, 1936. E. T. FERNGREN 2,030,059
PLASTIC WALL STRUCTURE
Filed Jan. 19, 1932 2 Sheets-Sheet 1
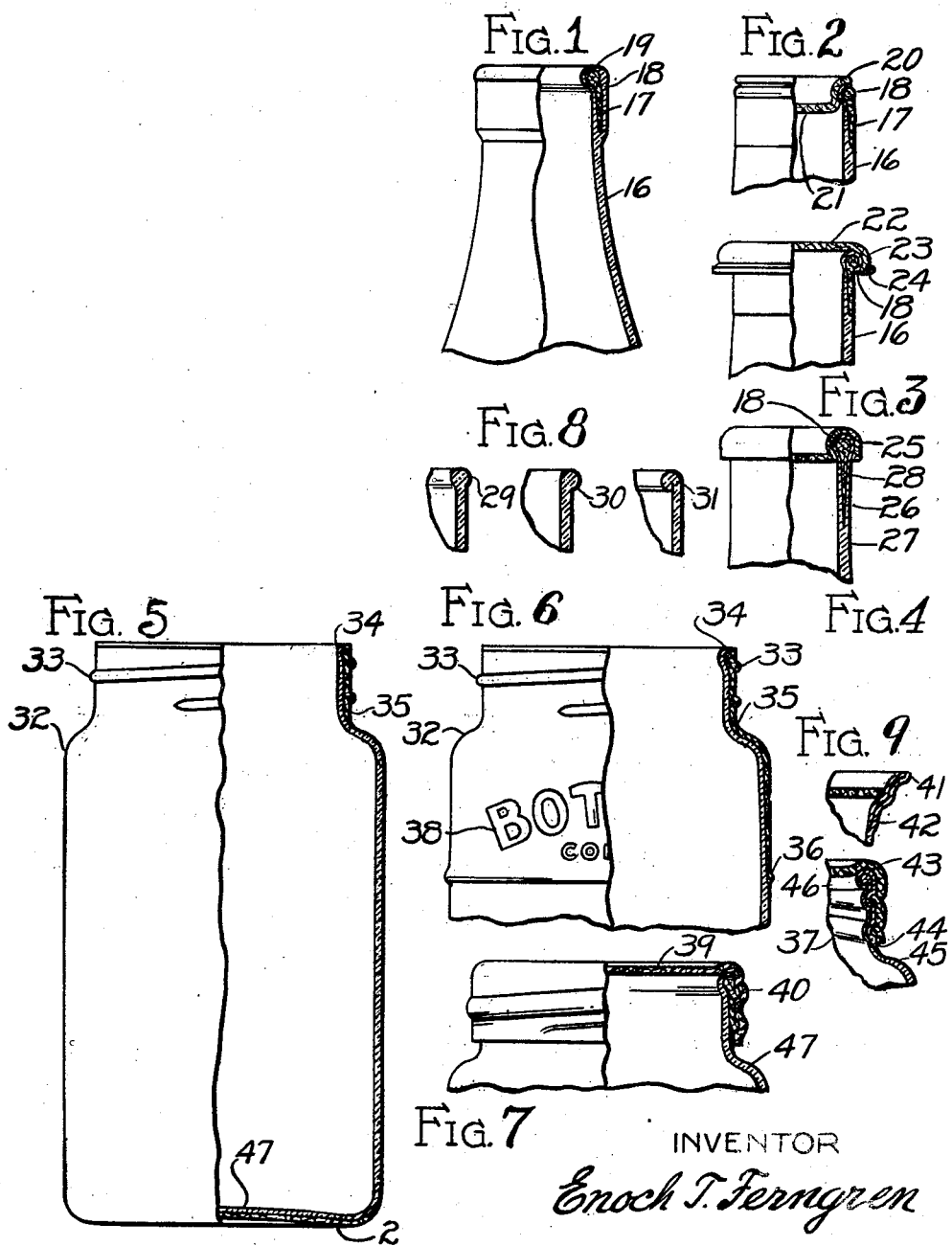
INVENTOR
Enoch T. Ferngren Feb. 11, 1936.   E. T. FERNGREN   2,030,059
PLASTIC WALL STRUCTURE
Filed Jan. 19, 1932   2 Sheets-Sheet 2
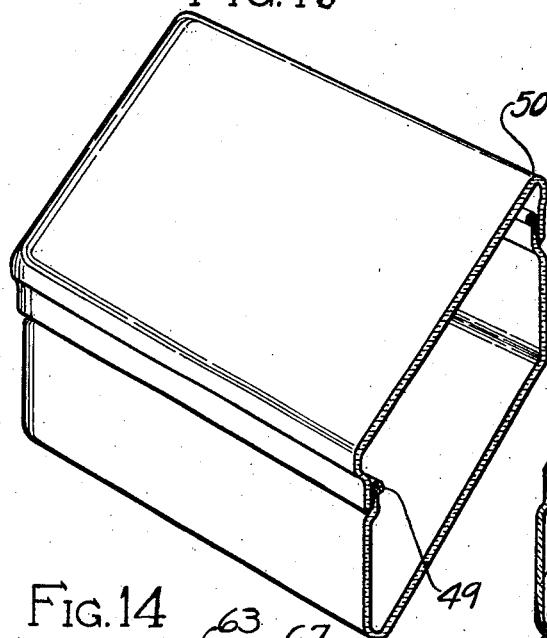
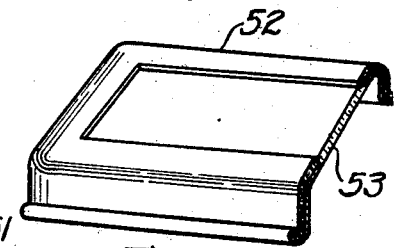
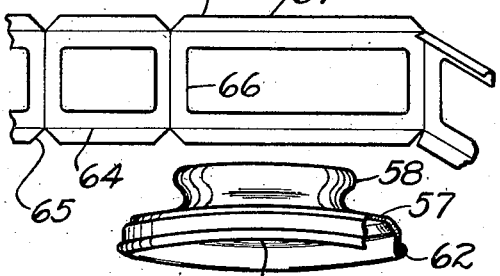
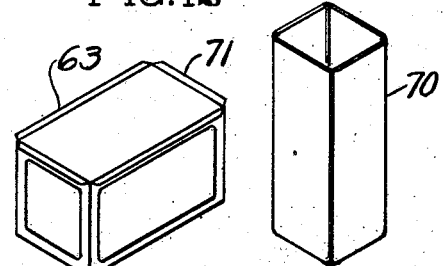
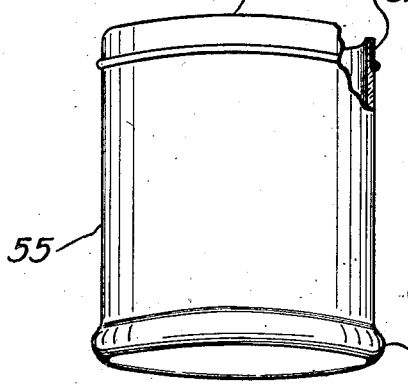
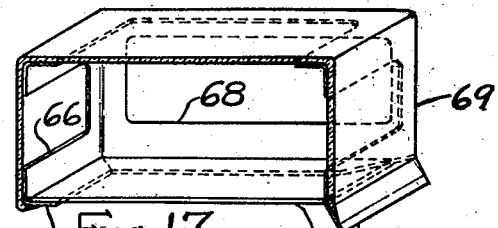
INVENTOR
Enoch T. Ferngren Patented Feb. 11, 1936

2,030,059

UNITED STATES PATENT OFFICE 2,030,059

PLASTIC WALL STRUCTURE

Enoch T. Ferngren, Toledo, Ohio

Application January 19, 1932, Serial No. 587,535

4 Claims. (Cl. 229—3.5)

This invention relates to improvements in molded containers of composite or re-inforced structure, which are partly formed of previously molded or press shaped material and partly of any type of a plastic that is moldable while in a fluent state.

According to my invention the main wall structure of the container is preferably formed out of such fluent plastics as may be spread as a coating or deposited as a layer film skin tissue and membrane along the inner wall surface of a mold cavity, in which the previously press shaped parts have been placed in shallow recesses and are held close in any suitable fashion, but preferably by vacuum. The plastic media is then spread or deposited where the reinforcing parts have been located or rest and so to speak form a part of the inner exposure of mold and these parts are then preferably coated on their exposed side by the plastic material which will adhere firmly thereto and these parts are thus made a part of the container.

With relation to producing different articles and the specific character of these, the invention relates to containers of different types such as bottles, jars, cans and boxes having reinforcements or stays at their top and bottom portions and at any exposed points where they are liable to be injured during handling or at corner sections, such stays being a part of the wall of the container which is molded as to its entire connected structure from any suitable plastic material.

The reinforcing parts or such other portions as may be added to the container structure such as labels or decorative effects are mostly press shaped from paper or other suitable and inexpensive material but certain reinforcement may be had, such for instance at the top of a bottle where the surplus wall portion can be formed at the time the container is molded which portion is then folded back or downward on the inner or outer side at the mouth of the bottle or at the edge of an opening of a box or jar or other container and then press shaped to act as a reinforcement or stay, and threaded sections may be formed thereon or any shape lip or brim suitable for use with caps, seals or covers formed thereon.

One object of the invention is to provide a light weight, strong, flexible and tough container at a low cost to the user, such containers being both of a collapsible type and of a more rigid structural makeup.

Another object is to provide a sanitary container, the inside of which is composed entirely of a transparent plastic material which is of an air and water proof composition and also non-affected by mild acids or alkalies, so that food stuff or merchandise packed or held in a container, carton or bottle of this type will not come in contact with the material which comprises the reinforcing parts, which may be made of paper or other porous stock and also of other plastics, but which are coated over and covered by the transparent plastic material of the bottle, and thus such parts will be made non-absorbing or so located in the wall structure as to be entirely out of contact with food or merchandise packed in the container.

Another object is to provide a container of any kind of a plastic or ductile material which may have a relatively tenuous, soft, ductile or fragile main wall structure but which when organized as herein shown will have a sufficiently rigid structure to be maintained in its original molded and intended shape so it may stand on its own bottom or side and be charged with merchandise or food materials in the same fashion as a container made of a more rigid stock, and be sealed or closed with a cover, lid or screw cap in the regular fashion.

Another object is to provide containers of molded wall sections with printed or decorated insert parts which are integral with and incased or embraced by the molded wall section, although in some instances such insert parts may be covered on just one side with the plastic material and thus while they are included and integral with the body of the wall section; are not entirely embraced thereby.

Another object in shaping which is common in nearly all types of containers such as are made out of glass is to form the upper end of the container with a shoulder, neck and lip with a beaded portion at the mouth of a bottle to which a cap or seal may be attached.

In connection with molded bottles of plastic materials this kind of shaping is of importance and has a different meaning in this that, when the lip wall of a bottle or the shoulder curvature thereof is thus shaped, additional strength is added to the film wall structure or tissue. Such shaping along walls and other points of a container and the molded lids may form fluted sections or annular spaces which will act as stays to maintain the shape of the structure and prevent its collapse during handling. Slight exaggerations in lip formation and curvatures may be employed which will build up additional strength for capping and handling.

Another object in a reinforcing sense while not involving the additional bracing parts is to provide the upper end or the wall around the opening of a container with a molded bead edge or a thickened brim portion which will add sufficient strength and rigidity for many types of containers, and of course such an edge can be made so as to flare inwardly or outwardly or to be folded over upon itself.

Another object is to provide molded insert parts for the bottom of a bottle or container which will curve upwardly where it joins the side walls, the upwardly turned wall section of the reinforcing part being tapered to a definite line thus gradually being joined to the molded structure, the increase in thickness of the thus laminated portion being progressive toward the bottom. Such reinforcements or stays are valuable to protect the corners and will give strong bottom portions.

Another object in connection with the use of screw caps with containers of the type herein contemplated is to provide an outside armor with the threaded portion already formed thereon at the upper end of a jar, bottle or can, such armor having a required degree of rigidity according to the material of which it is made but forming an insert or addition at the upper end of a container to the inner side of which the plastic wall section is attached. The main inventive idea is this, that the inner side of the insert is perfectly smooth having no depression or projected curvature to mar the smoothness of the inner film surface of this section of bottle; these threaded insert parts being so shaped that the threaded sections are raised thereon without any corresponding cavitation on the side that is opposite to the raised portion. Such constructions are desirable for many purposes and are sanitary in this, that there will be no recesses at the inner side of the neck wall of the bottle, where food materials may lodge and become changed in their nature.

While the invention is primarily directed to bottle containers, boxes and cans may also be molded in a similar fashion from plastics, with insert parts which may be printed or in colors. The lips or covers for such containers may of course also be molded in such shape, as to impart greater stability and strength with or without insert parts.

Another container item of practical utility shown herein which may be molded and even press formed as to its outside shape from a transparent plastic or from translucent plastic materials, is a thin wall carton for packing butter, ice cream and numerous other food products. Such a carton may be molded in square shape, with reinforcing sections included as a part of its wall structure, or it may be molded without such sections which can be inserted thereinto at the same time that the brick or food material is introduced into the carton; or the reinforcing sections which are preferably die cut, may be introduced so as to lie inside of the molded walls, or to lie outside of the same when convenient in the handling; or as may be predetermined by the type of machinery used when packing and sealing such cartons.

In the drawings

Fig. 1 illustrates a narrow neck bottle structure partly in section showing a reinforcing bead section and side wall at lip and neck of bottle, in accordance with the present invention.

Fig. 2 illustrates a similar construction associated with an inner sealing plug, which has freedom for expansion below the sealing point of the bottle neck.

Fig. 3 illustrates a similar construction of a bottle neck with an outside sealing point for the cap.

Fig. 4 illustrates a narrow neck bottle type for inner and outer sealing grip with cap, the wall section of the insert being embedded at all points in the plastic material.

Fig. 5 is a showing partly in elevation and section of a screw top jar, with reinforced top and bottom parts on the outside of the film wall; the threads formed on the outside of the top insert without any corresponding depression on its inner side.

Fig. 6 is a similar showing of the armored type of a printed reinforcing part covering shoulder and side wall of a bottle.

Fig. 7 shows the upper end of a threaded jar partly in section with a pressed fiber cap attached thereto.

Fig. 8 illustrates different types of beaded reinforcements or thickened wall portion which are molded of the same material as the container and may also be formed by reversing an edge thereof downward.

Fig. 9 shows fragmentary views in section of a folded or two ply film wall illustrating a milk bottle and a jar; the upper edge of the jar portion being folded a second time making a four ply section structure of beaded form at this point.

Fig. 10 is a perspective view partly in section showing a box with a lid structure, a reinforcing bead section being molded into the upper edge wall of the box.

Fig. 11 illustrates a stamped or pressed cover lid to which a transparent wall section has been molded or added.

Fig. 12 is a sectional fragmentary perspective showing of the corner section of a box such as shown in Fig. 10, with a reinforcing corner strip molded into its structure.

Fig. 13 is a perspective showing with a sectional detail, of a humidor can and its cover lid, the main structure of the can and lid being molded to form annular reinforcing and staying wall sections at top of lid and bottom of can; the adjacent cooperative edges of lid and can being reinforced by parts, or by folding and pressing a surplus wall portion as shown.

Fig. 14 illustrates a die cut fiber or paper reinforcing part to be used as an insert or as an outside corner protection or to be included at an integral part, being molded with a transparent molded container of the carton type.

Fig. 15 illustrates how this die cut reinforcing part looks when surrounding a square object such for instance as a package of butter.

Fig. 16 illustrates a type of square bag or carton into which an assembly such as shown in Fig. 15, may be introduced.

Fig. 17 is a perspective showing partly in section of a carton molded from a plastic material with the reinforcing parts such as shown in Fig. 14, molded thereto.

Such plastic materials, as cellulose acetate, nitrocellulose and a number of natural and synthetic plastics, of different kind and nature, but alike in this that they can be molded by processes such as described in my copending applications, Serial Nos. 499,771 and 586,184, to form transparent film walls of more or less flexible nature, can be used to fashion containers of the kind herein described, with or without the addition of supplemental reinforcing structures.

In molding a container, such as shown in all of the drawings in this disclosure, with reinforcing parts added at the time of molding, the procedure is to insert the reinforcing section into the mold, to be held therein by suitable recesses and by suction, or by the normal spring like grip of these parts before the plastic material is admitted and spread as a coating over or around these parts to include or embed the same in the plastic. As the plastic wall is rendered firm or is coagulated to a solid state and is then removed from the mold these inserted portions will have become a fixed part of the walls of the container, being no longer associated with the molds.

Containers of this type will find many uses, at a considerable saving, particularly where the bottle is used only once or where it is lost to the packer of a food product, being sold with the product, or where it is lost, or has to be picked up, returned and cleaned, as is the case with many carbonated beverage bottles and to a very great extent with milk bottles, involving an enormous outlay of money for sterilization, cleaning and handling.

The process of making the container heretofore outlined, may be practiced in several ways, by different methods of introducing and handling the plastic and in its treatment, but such is not the subject of the present invention, which is confined to the structural makeup of containers from transparent plastics with the addition of stays or reinforcing parts.

One of the things concerned, in the making of containers from plastic materials, is this, that the economical production requires limitation of the quantity of material used in each container while on the other hand practical requirements for strength and durability, require a certain thickness of wall structure which consumes a larger quantity of the plastic material than is economically feasible. In order to produce these items at a cost price as compared to other containers which will be attractive to the user, and allow some profit to the manufacturer.

A narrow neck bottle type within my invention is represented in Fig. 1, the neck 16 of the bottle having inserted therein a reinforcing ring-like portion 17 with a beaded or enlarged top section 18 which is completely surrounded by the plastic material 19 forming a very durable and hard bottle neck suitable for internal capping, in the manner originally disclosed in my copending application Serial No. 586,184, as more particularly shown in Fig. 2, where the expanding plug cap 20, is shown as tightly gripping the bead 18 of the part 17, which in this particular showing is covered and attached on its inner side only with the plastic material; the lower expanding portion 21 or cap forming a satisfactory seal for this type of a neck construction.

The cap 22 is adapted for use with a narrow neck bottle or any other type of container having a beaded edge where the bead is turned outward so as to provide a gripping edge. As shown in Fig. 3, the depending wall portion 23 of the cap 22 extends under the bead 18, the brim 24 of the cap making possible a very firm seal while the cap is associated with the bottle, and likewise permitting its removal by the application of an upwardly moving force against the lower side of brim 24, this combination is shown in Fig. 3.

A bottle mouth of this type, can however be made in such a way that the seal with the bead 18 will be on both the inner and outer face. The combination shown in Fig. 4, represents the most perfect arrangement and shape of a reinforcement part 26 which is completely embedded in the plastic material 27 during molding the bead 18 thereof also being covered by the plastic material.

The cap shown having an outside gripping wall point 25 and an inner gripping wall point 28 which provides a combination of sealing effects, which is of practical value for use with carbonated beverages.

With relation to jars the showing in Figs. 5, 6, and 7 reveal forms of construction, the bottom portion of jar 41 being reinforced by the pressed or otherwise formed bottom part 2 and the neck portion reinforced by a pressed strip which is cut and curved to form the ring like structure 35 which has raised threaded portions 33 embossed on its surface and a beaded end 34 at its top, the molded shoulder curvature 32 adding strength to the wall structure without any reinforcement at such point. The jar shown in Fig. 6, has a protective armor in the form of a downwardly extending portion 35, which ends in the beaded edge 36 at any suitable point on the median section of the jar structure. This body armor can be lithographed in many colors before it is incorporated with the plastic material in the mold and may likewise be provided with outside ribs or threads 33 to accommodate a screw cap 39 such as shown in Fig. 7, which cap is provided with threaded portions 40 to cooperate with threads 33.

The main utility aside from providing a regulation screw top jar, resides in this, that the inner face of the reinforcing portion 35 is free from any annular grooves at the side opposite to the raised rib 33, thus insuring a perfectly smooth interior at this section of the jar which is advantageous particularly when handling mayonnaise which when separated from the larger portion of its bulk in the main section of the bottle is likely to decay or become rancid when lodged in a small quantity in crevices and cavities at the upper section of the bottle, where it is exposed to the air after the bottle has been partly emptied of its contents. The letering 38 on the outside of reinforcing portion 35 in Fig. 6, is indicative of how this section may be labeled or printed. In this connection it is worthy of note, that any of the containers herein shown may be lithographed or printed in many colors after they have been molded and completely finished in other respects.

The reinforcement of neck portions of a jar or bottle as illustrated in the fragmentary showings in Fig. 9, bring out how the upper lip brim of a milk bottle, may be formed without adding any other reinforcing part, by molding an additional section of wall beyond the edge proper of the bottle formation, and then folding such section to double over with the molded wall thereby increasing its thickness correspondingly and its strength and rigidity many times.

The fragmentary showing 37 under the same figure number illustrates how a similar formation is folded down on the outer side of a bottle neck and then doubled over at its uppermost point 46, to form the curved bead 43 which will be of four ply thickness, this type of reinforcement being press shaped by means of suitable heated dies to form the required thread formation for a screw cap 44 and being most suited for a bottle containing liquids as indicated by the shoulder curvature 45 of the bottle structure.

Boxes may also be molded by several different processes or otherwise shaped from plastic materials and provided with rib braced reinforcing edge parts or other sections, which reinforcements may be transparent if so required or of any colored tint or degree of translucency. The box 48 shown in Fig. 10, having a reinforcing member 49, the lid 50 being reinforced by the particular shape given thereto during molding, the projecting wall portion 51 adding considerable firmness.

The lid 52 shown in Fig. 11, may be molded or press formed of one material while the insert portion 53 is transparent or the opposite may be the case if such is required. Box structures such as 48 may also be provided with angular reinforcement or binding rib at shoulder 54 to strengthen its corner section. Such part may of course be molded directly into the plastic material and should preferably have their outer side decorated or printed.

Cams or humidor, jars for cigars of different types, or like container for candies or other products, can be molded with reinforcing stays by reason of the curving or curvatures of the wall structures, of both can or lid during molding, or by the folding in and forming of reinforcing sections from surplus wall portions, but other types of rigid or semi-rigid inserts may be added as rim beads, such as shown in Fig. 13, where the can 55 has the expanded and curved side wall 56 near its bottom portion to give additional strength and the lid 57 is likewise provided with a similar arrangement 58, the edge portions 59 and 60 of the can and the lid given added strength by means of reinforcing parts 61 and 62 which parts may be made of a transparent plastic of a different composition or a totally different material from that used in molding the can or the lid and one not affected by the same conditions, solvents or temperature treatments.

The parts shown in Figs. 14 to 17 relate to transparent carton construction, the reinforcement part being a strip of die cut reinforcement material 63 which is scored, creased and cut at its point of folding as at 64 and 65 so that sections 66 and 67 may be turnable at right angle to one another, each individual panel 68 being formed from a reinforcement skeleton in the molded container 69 and 70. The die cut section 63 is shown as forming a cage 71 on the outside of a molded carton or as placed on the outside of a pound of butter, or a brick of ice cream, before introducing such food stuff into the molded carton 70, shown in Fig. 16, which carton or bag is produced without any reinforcement and which may be press shaped as well as molded.

The assembly shown in Fig. 17, however is preferable, where a transparent reinforcement structure which has been die cut from sheet stock has been molded in as a part of the transparent structure, the parts 66 and 67 forming individual panels 68 at all faces of the package except at the open side, where a transparent panel 73 is held in place by means of the composite or laminated inwardly folding sections 71, which are connected to the transparent panels by means of any suitable transparent adhesive and forming a very attractive transparent carton for candies, baked goods and merchandise of all kinds. Such a carton may of course be provided with reinforcing sections of an opaque nature and of any color or metallic luster, which is equally true of all the reinforcing sections herein mentioned which may be transparent but also may be formed of translucent or opaque material.

I wish it understood that such expedients in reinforcements as the placing of a strip or ring in the edge portion at the open end of a container to thereby impart form retaining rigidity to the upper wall section of an open container may be accomplished by other procedures than molding as heretofore described. For instance the strip may be inserted and become a part of the wall section by folding a supplementally molded wall section or by providing a recess to hold such reinforcement, or these two ways may be combined by first placing the reinforcement in the recess and then folding a surplus wall section thereover. Such constructions would be useful in the making of light weight thin walled drinking cups, first by the molding process from a suitable plastic and then giving serviceability to the structure by the incorporation of a light reinforcement piece or strip at the open end which would also give thickness to this portion at the edge of container, and form a lip edge thereof.

Having thus described my invention;

I claim:

1. A container having walls of a moldable flexible cellulosic plastic material and having molded therein a reinforcing softer fibrous section as an integral molded in section of its wall structure.

2. A container having walls formed of a moldable cellulosic transparent plastic material and having embedded in such walls sections of softer fibrous material with printed matter thereon as integral parts.

3. A container structure having flexible one ply thin skin membranous wall formations and reinforcements of softer fibrous material at its bottom and top to form rigid top and bottom portions and intermediate unreinforced portions, the entire structure being formed as one integral unit.

4. An open top container having a flat top and side walls of a one ply flexible thin membrane of plastic material with an edge of the top formed of a softer and porous fibrous material which is integrally included and stiffened structurally through internal absorption of and union with the plastic material along its upper wall section around the open end of the body portion.

ENOCH T. FERNGREN.